US008221858B2

(12) United States Patent
Mannella et al.

(10) Patent No.: US 8,221,858 B2
(45) Date of Patent: Jul. 17, 2012

(54) THREE-DIMENSIONAL PARTS HAVING POROUS PROTECTIVE STRUCTURES

(75) Inventors: Dominic F. Mannella, Minnetonka, MN (US); Robert L. Zinniel, Plymouth, MN (US); S. Scott Crump, Wayzata, MN (US)

(73) Assignee: Stratasys, Inc., Eden Prairie, MN (US)

( * ) Notice: Subject to any disclaimer, the term of this patent is extended or adjusted under 35 U.S.C. 154(b) by 35 days.

(21) Appl. No.: 13/020,105

(22) Filed: Feb. 3, 2011

(65) Prior Publication Data

US 2012/0018926 A1 Jan. 26, 2012

Related U.S. Application Data

(60) Provisional application No. 61/366,605, filed on Jul. 22, 2010.

(51) Int. Cl.
*B29C 41/02* (2006.01)

(52) U.S. Cl. ......... 428/34.1; 134/37; 264/308; 425/375; 428/43

(58) Field of Classification Search .................... None
See application file for complete search history.

(56) References Cited

U.S. PATENT DOCUMENTS

| | | | |
|---|---|---|---|
| 4,247,508 A | 1/1981 | Housholder | 264/219 |
| 4,863,538 A | 9/1989 | Deckard | 156/62.2 |
| 4,938,816 A | 7/1990 | Beaman et al. | 156/62.2 |
| 4,944,817 A | 7/1990 | Bourell et al. | 156/62.2 |
| 5,017,753 A | 5/1991 | Deckard | 219/121.63 |
| 5,053,090 A | 10/1991 | Beaman et al. | 156/62.2 |
| 5,076,869 A | 12/1991 | Bourell et al. | 156/62.2 |
| 5,132,143 A | 7/1992 | Deckard | 427/197 |
| 5,155,324 A | 10/1992 | Deckard et al. | 219/121.64 |
| 5,204,055 A | 4/1993 | Sachs et al. | 419/2 |
| 5,296,062 A | 3/1994 | Bourell et al. | 156/62.2 |
| 5,316,580 A | 5/1994 | Deckard | 118/110 |
| 5,342,919 A | 8/1994 | Dickens, Jr. et al. | 528/323 |
| 5,382,308 A | 1/1995 | Bourell et al. | 156/62.2 |
| 5,527,877 A | 6/1996 | Dickens, Jr. et al. | 528/323 |
| 5,597,589 A | 1/1997 | Deckard | 425/174.4 |
| 5,616,294 A | 4/1997 | Deckard | 264/413 |
| 5,639,070 A | 6/1997 | Deckard | 264/497 |
| 5,648,450 A | 7/1997 | Dickens, Jr. et al. | 528/323 |
| 5,990,268 A | 11/1999 | Dickens, Jr. et al. | 528/323 |
| 6,136,948 A | 10/2000 | Dickens, Jr. et al. | 528/323 |
| 6,245,281 B1 | 6/2001 | Scholten et al. | 264/497 |
| 6,589,471 B1 | 7/2003 | Khoshnevis | 264/497 |
| 7,037,382 B2 | 5/2006 | Davidson et al. | 134/21 |
| 7,125,512 B2 | 10/2006 | Crump et al. | 264/328.1 |
| 7,255,821 B2 | 8/2007 | Priedeman, Jr. et al. | 264/219 |
| 7,794,647 B1 | 9/2010 | Deckard | 264/497 |
| 2010/0086721 A1 | 4/2010 | Batchelder | 428/43 |

*Primary Examiner* — Mary F Theisen
(74) *Attorney, Agent, or Firm* — Brian R. Morrison; Westman, Champlin & Kelly, P.A.

(57) ABSTRACT

Three-dimensional parts having porous protective structures built with powder-based additive manufacturing systems, the porous protective structures being configured to protect the three-dimensional parts from damage during de-powdering processes.

20 Claims, 4 Drawing Sheets

THREE-DIMENSIONAL PARTS HAVING POROUS PROTECTIVE STRUCTURES

CROSS-REFERENCE TO RELATED APPLICATION(S)

This application claims priority to U.S. Provisional Patent Application No. 61/366,605, filed on Jul. 22, 2010, and is entitled "Three-Dimensional Parts Having Porous Protective Structures", the contents of which are incorporated by reference in its entirety.

BACKGROUND

The present disclosure relates to additive manufacturing systems for building three-dimensional (3D) parts with additive manufacturing techniques. In particular, the present disclosure relates to systems and processes for building 3D parts from powder-based additive manufacturing systems, and processes for removing unbound powder materials.

Additive manufacturing systems are used to build 3D parts from digital representations of the 3D parts (e.g., STL format files) using one or more additive manufacturing techniques. Examples of commercially available additive manufacturing techniques include fused deposition modeling, ink jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to form the given layer.

For example, a printer system that builds 3D parts with powder materials and binder resins typically deposits the powder materials in incremental layers. For each layer, the system also deposits (e.g., jets) a binder resin along tool paths pursuant to computer-generated instructions. The binder resin infiltrates the powder materials at the deposited locations, thereby binding the powder materials to form the given layer of the 3D part. This process may then be repeated for each successive layer until the 3D part is completed, where the unbound portions of the powder materials function as a support structure for the built layers of the 3D part.

Once the 3D part is built, the unbound powder materials are desirably removed. However, portions of the unbound powder materials may remain caked to the 3D part. The caked powder materials may be manually removed, such as by hand brushing. However, manual removal techniques are labor intensive and slow operations. Furthermore, purportedly-automated systems for removing powder materials typically require high shear air flows, which can blow the 3D part around within a chamber, thereby potentially damaging fine features of the 3D part.

SUMMARY

A first aspect of the present disclosure is directed to a method for building a 3D part. The method includes receiving a digital representation of the 3D part, and generating a digital representation of a porous structure. The generated porous structure includes a digital representation of a porous outer frame for the 3D part, and a digital representation of at least one extension between the porous outer frame and the 3D part, where the at least one extension is configured to operably tether the 3D part within the porous outer frame. The method also includes generating layer-based tool paths for building the 3D part in a powder-based, additive manufacturing system, where the layer-based tool paths are generated based at least in part on the digital representation of the 3D part and the digital representation of the porous structure.

Another aspect of the present disclosure is directed to a method for removing unbound powder materials from a 3D part. The method includes providing a 3D part operably tethered to a porous structure, where the 3D part and the porous structure are built from a powder-based additive manufacturing system with a powder material. The method also includes generating an air flow around the 3D part and the porous structure that is sufficient to remove substantially all unbound powder materials from the 3D part.

Another aspect of the present disclosure is directed to a 3D assembly built with a powder-based, additive manufacturing system. The 3D assembly includes a 3D part based at least in part on a digital representation of the 3D part, and a porous structure configured to protect the 3D part during a de-powdering process. The porous structure includes a porous outer frame, and at least one extension connected to the porous outer frame and operably tethering the 3D part within the porous outer frame.

Another aspect of the present disclosure is directed to a system for building a three-dimensional part. The system includes a build chamber, a powder delivery system configured to deliver powder materials to the build chamber, and a tool head configured to solidify portions of the delivered powder materials to form layers of the three-dimensional part and layers of a porous structure. The system also includes a powder removal system configured to remove unbound powder materials from the build chamber, where the porous structure is configured to protect the three-dimensional part from damage during a de-powdering process.

DETAILED DESCRIPTION

The present disclosure is directed to 3D parts built with powder materials, where the 3D parts include porous structures that protect the 3D parts from damage by externally applied shears, impacts, torques, and general abuse required to de-powder the 3D parts. Many of the systems used to build 3D parts from powder materials are capable of producing delicate features for the 3D parts. Such features may be susceptible to damage when subjected to conventional de-powdering processes, such as from high shear air flows. As such, in a conventional setting, operators may be required to manually manipulate the caked powder materials enclosing the 3D part while selectively vacuuming or blowing off the excess, in order not to crack or break off the delicate features of the 3D parts.

The porous protective structures of the present disclosure, however, desirably allow 3D parts having delicate features to be de-powdered with fully automated processes. In particular, the porous protective structures function as sacrificial barriers that may absorb damage (e.g., impact damage) that would otherwise be applied to the 3D parts, thereby allowing high shear air flows to be used in an automated de-powdering process. The automated process substantially reduces the time required to remove the unbound powder materials from the 3D parts, while also reducing exposure of operators to the powder materials.

Figure 1:
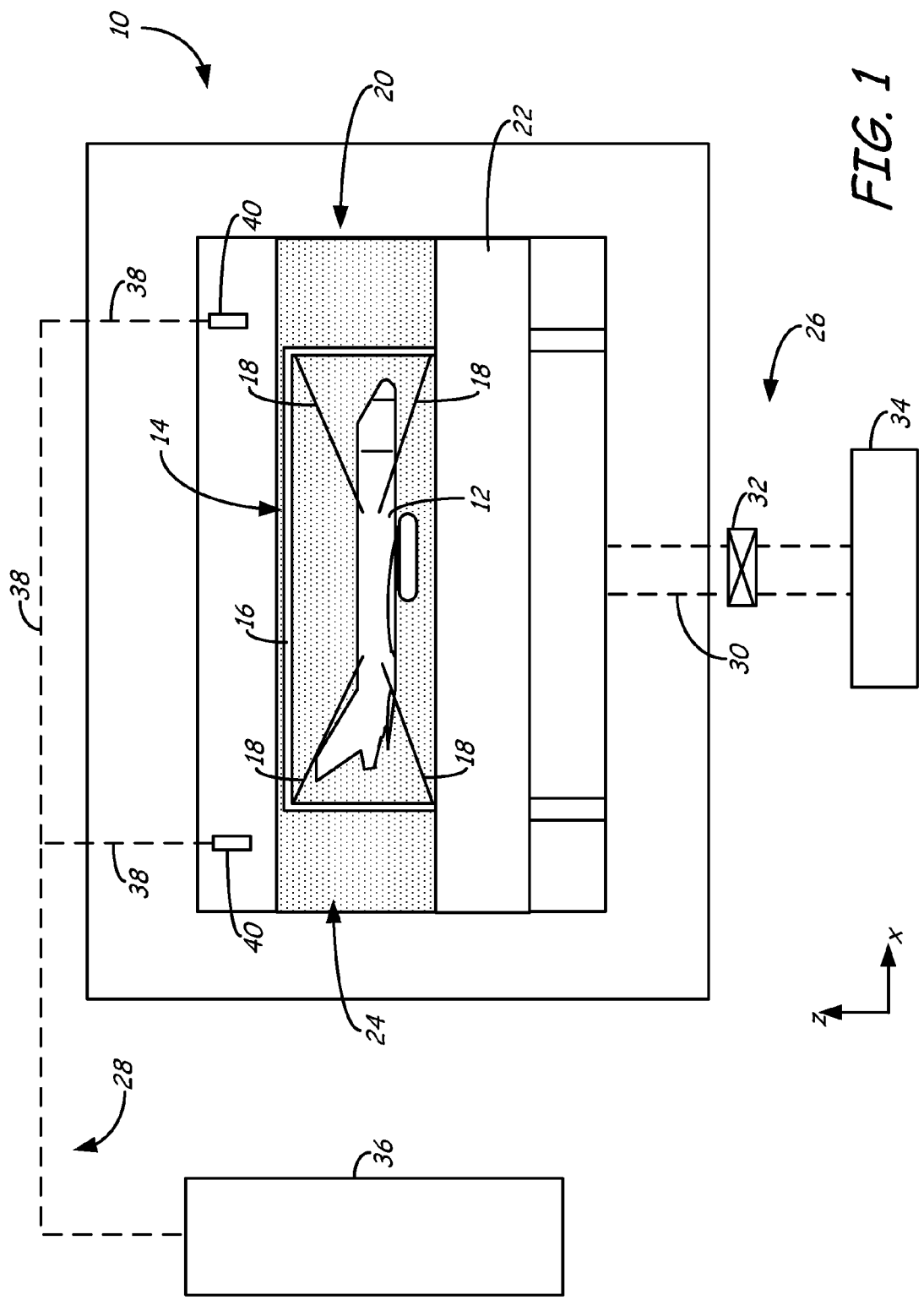
FIG. 1 is a schematic illustration of a system for building a 3D part with a porous protective structure.

As shown in FIG. 1, system 10 may build 3D part 12 and protective structure 14 using a additive manufacturing technique, where protective structure 14 is a porous structure that includes outer frame 16 and extensions 18. Examples of suitable systems for system 10 include powder-based additive manufacturing systems, such as selective laser sintering systems, powder/binder systems (e.g., systems disclosed in Sachs et al., U.S. Pat. No. 5,204,055), sand casting systems, electron-beam systems, and the like.

In the shown embodiment, system 10 includes build chamber 20 and platform 22. Build chamber 20 is desirably an enclosed chamber in which 3D part 12 and protective structure 14 are built. Platform 22 is retained within build chamber 20 and provides a surface for receiving the powder materials, and for building 3D part 12 and protective structure 14. System 10 may also include a variety of additional components for building 3D parts and porous protective structures, such as a powder delivery system, one or more tool heads, and the like. For example, in a powder/binder process, system 10 may include one or more deposition tool heads (e.g., jetting heads) for depositing one or more binder resins.

System 10 may build 3D part 12 and protective structure 14 in a layer-by-layer manner by delivering incremental layers of one or more powder materials. For each layer of powder materials, the tool head selectively solidifies particular portions of the powder materials based on one or more generated tool paths. This forms the given layer for 3D part 12 and protective structure 14. For example, in a powder/binder process, a binder resin may be deposited to infiltrate the powder materials at the deposition locations, thereby binding the powder materials to form solid regions.

Accordingly, the resulting assembly of 3D part 12 and protective structure 14 may be built from the same powder materials, where the unbound powder materials (referred to as bed 24) may function as a support structure to support overhanging regions of 3D part 12 and protective structure 14. This process may be repeated for each layer of 3D part 12 and protective structure 14 until bed 24 of the powder materials reaches or exceeds the height of protective structure 14 along the vertical z-axis.

As used herein, the term "bound material" refers to a powder material that has been solidified, such as by chemical solidification (e.g., with a binder resin) and/or by a thermal solidification (e.g., with a selective laser sintering process). Correspondingly, as used herein, the term "unbound powder material" refers to a powder material that is not solidified by either chemical solidification or thermal solidification. Furthermore, as used herein, the term "porous", with reference to a structure being porous, refers to the structure having openings that allow air to pass through, such as the frame structure of outer frame 16, a cage structure, a web structure, a screen structure, and the like.

Figure 2:
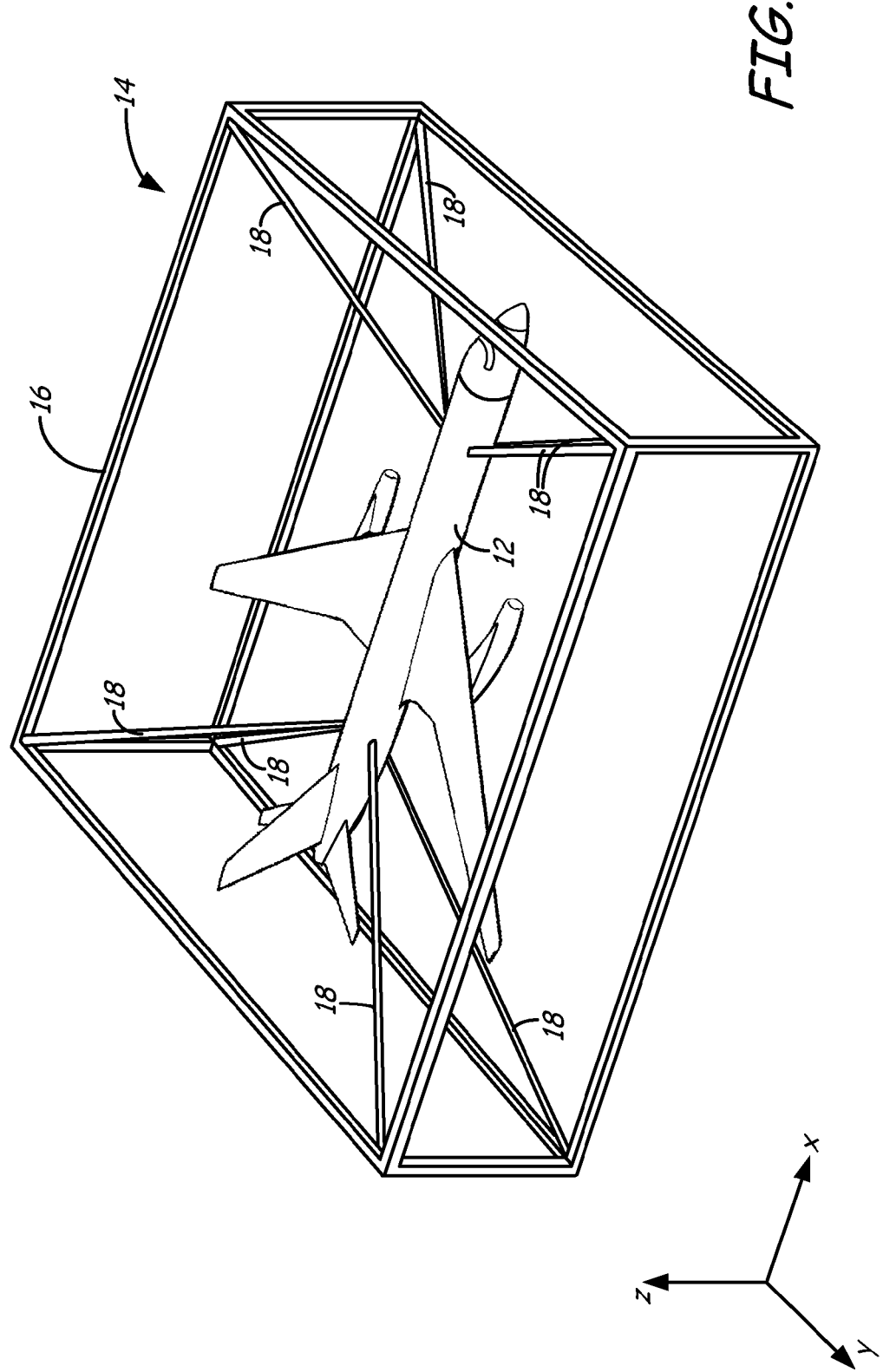
FIG. 2 is a schematic illustration of a 3D part with a porous protective structure.

As shown in FIG. 2, outer frame 16 of protective structure 14 has outside dimensions that generally conform to the bounding box of 3D part 12. Outer frame 16 is shown as having rectangular dimensions, but out frame 16 and build chamber 20 may alternatively exhibit other shapes, such as cylindrical and oval shapes. Likewise, in further alternative embodiments, outer frame 16 may not necessarily conform to the bounding box of 3D part 12, so long as outer frame 16 protects 3D part 12. Extensions 18 extend from corner intersections of outer frame 16 and connect to various locations along 3D part 12. This rigidly tethers 3D part 12 within outer frame 16 in a manner that desirably prevents 3D part 12 from contacting outer frame 16. As such, if protective structure 14 becomes dislodged in build chamber 20 (or in a separate de-powdering chamber) due to a high shear air flow from a de-powdering process, outer frame 16 will absorb the damage that may occur when outer frame 16 impacts the walls of build chamber 20. Additionally, in embodiments in which multiple 3D parts are built within build chamber 20 (e.g., multiple 3D parts 12), a single protective structure 14 may envelope all of the 3D parts to prevent the 3D parts from impact damage against the walls of build chamber 20, and to prevent the 3D parts from impact damage against each other.

As shown, protective structure 14 has an open, porous structure that allows the high shear air flow and the powder materials of bed 24 (shown in FIG. 1) to flow through it. This arrangement allows the unbound powder materials caked to 3D part 12 to be removed. In alternative embodiments, protective structure 14 may exhibit a variety of different geometries. For example, protective structure 14 may exhibit a cage, web, or screen-like structure with multiple vertical and/or horizontal frame structures to increase the structural integrity of outer frame 16. Furthermore, the number of extensions 18, and the connection locations between extensions 18 and 3D part 12 may vary depending on the design and dimensions of 3D part 12 and outer frame 16. The number of extensions 18 and the connection locations desirably allow 3D part 12 to remain rigidly tethered within outer frame 16 during the de-powdering process, while also desirably minimizing any detriment to the aesthetic qualities of 3D part 12.

When the build operation is complete in system 10, the unbound powder materials may then be removed from build chamber 20 in an automated manner. As discussed above, protective structure 14 protects 3D part 12 from damage by externally applied shears, impacts, torques, and general abuse required to de-powder build chamber 20. For example, a vacuum may be drawn with vacuum system 26 (shown in FIG. 1), and/or pressurized air may be blown through build chamber 20 with compressor system 28 (shown in FIG. 1) to evacuate the unbound powder materials from build chamber 20.

As shown in FIG. 1, vacuum system 26 may include vacuum line 30, valve 32, and trap 34, where vacuum line 30 may interconnect build chamber 22 and trap 34. Valve 32 operably opens and closes vacuum line 30 for de-powdering build chamber 20. Trap 34 is a container for capturing the withdrawn powder, and is desirably connected to a vacuum pump (not shown). In the shown embodiment, the vacuum withdrawal of the powder from build chamber 22 is generated in a vertical, downward direction. In alternative embodiments, the vacuum withdrawal may be generated in different directions, such as a horizontal direction.

As further shown, compressor system 28 includes compressor 36, air line 38, and adjustable jets 40. Compressor 28 is a container of pressurized air (or other suitable gas, such as one or more inert gases), or may be an air/gas compressor, which is configured to direct the pressurized air into build chamber 22 via air line 38 and adjustable jets 40. Adjustable jets 40 may include one or more adjustable jets, more desirably a plurality of adjustable jets, that may be adjusted to direct the compressed air to desired locations within build chamber 22, such as at 3D part 12.

The air flow within build chamber 22 may be generated using a variety of different techniques. For example, the air flow may be blown through build chamber 22 using a pressure-neutral-closed loop vacuum in which the air (and the powder) is pulled by vacuum from build chamber 22, while also forcing air back into build chamber 22 to provide a closed loop air flow. Alternatively, the air flow may be blown through build chamber 22 using a pressure-positive compressed air arrangement in which the air (and the powder) is blown out of build chamber 22. In another alternative example, the air flow may be blown through build chamber 22 using a pressure-negative arrangement in which the air (and the powder) is pulled by vacuum from build chamber 22.

In an alternative embodiment, 3D part 12 and protective structure 14 may be removed from build chamber 20 and placed in a separate de-powdering system for removing the caked, unbound powder materials from 3D part 12, where the separate de-powdering system may also create high shear air flow. In this embodiment, the separate de-powdering system may include a thin-wall structure, such as a poly(methyl methacrylate) structure commercially available under the trade designation "PLEXIGLAS" from Rohm and Haas Company.

The high shear air flow is desirably sufficient to remove the unbound powder materials that remain caked to 3D part 12. In one embodiment, compressed air may also be blown toward 3D part 12 to further assist in the removal of the caked, unbound powder materials. While being subjected to the high shear air flow, protective structure 14 protects 3D part 12 from damage by tethering and restraining 3D part 12 relative to outer frame 16 with the use of extensions 18. For example, the high shear air flow may blow 3D part 12 and protective structure 14 around within build chamber 20 (or other de-powdering chamber), such as due to turbulent air flow vortices. This may cause outer frame 16 to impact various walls of the chamber, thereby causing protective structure 14 to absorb the damage from the impacts. This protection prevents 3D part 12, particularly any fine features of 3D part 12, from being damaged during the de-powdering process with the high shear air flow. As discussed above, because high shear air flow may be used to remove the unbound powder materials, the de-powder process may be fully automated.

After the de-powdering process is complete, extensions 18 of protective structure 14 may be broken off or otherwise removed from 3D part 12. Any surface blemishes to 3D part 12 at the connection locations with extensions 18 may also be removed with one or more additional post-processing techniques.

Figure 3:
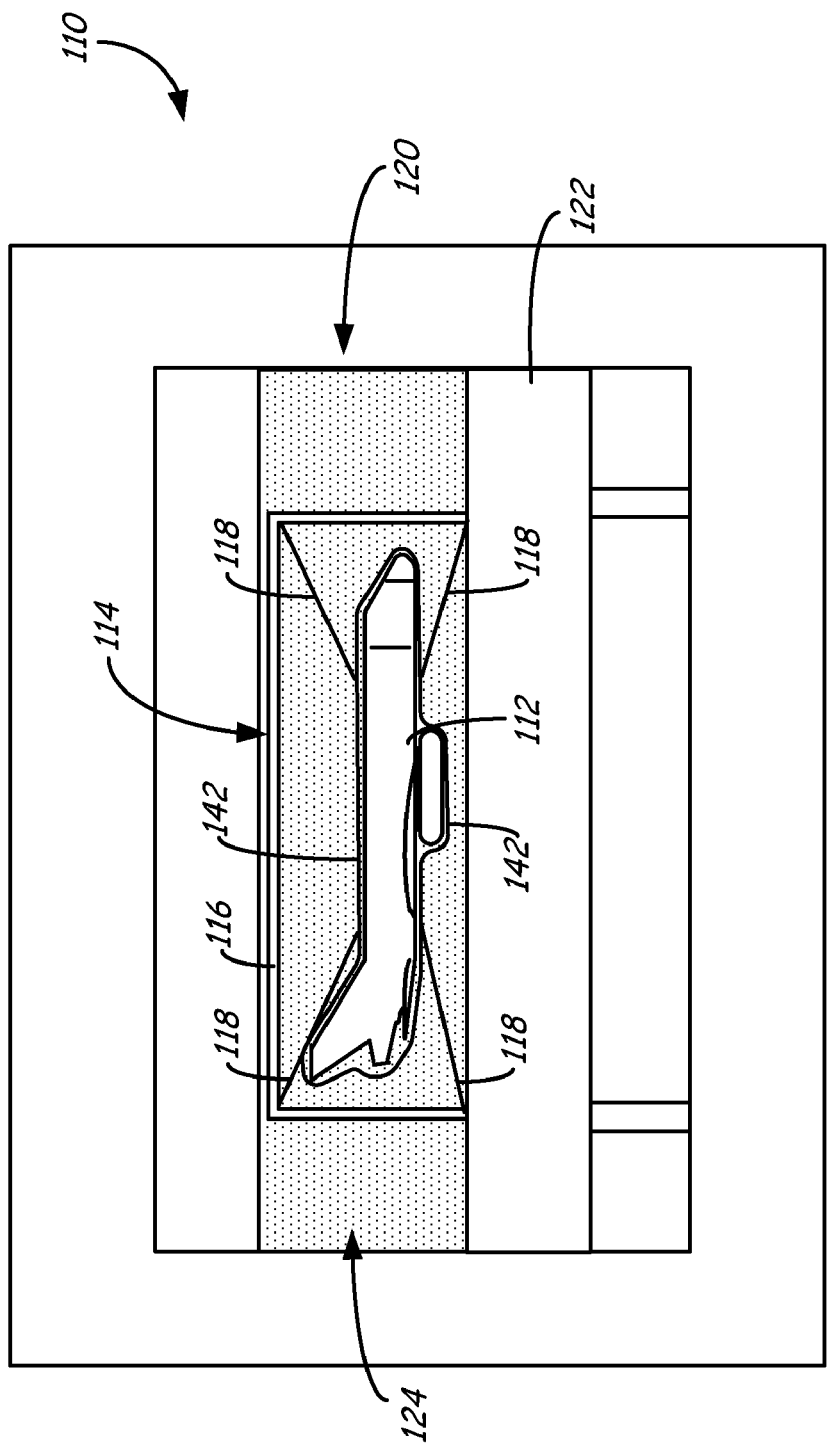
FIG. 3 is a schematic illustration of a 3D part with an alternative porous protective structure.

FIG. 3 illustrates an alternative embodiment to 3D part 12 and protective structure 14 (referred to as 3D part 112 and protective structure 114), where the same de-powdering process discussed above may also be applied to 3D part 112 and protective structure 114. For ease of discussion, the corresponding reference labels used for system 10, 3D part 12, and protective structure 14 in FIGS. 1 and 2 are increased by "100" in FIG. 3. While not shown in FIG. 3, system 110 may also include a vacuum system and compressor system corresponding to vacuum system 26 and compressor system 38 of system 10.

As shown in FIG. 3, protective structure 114 further includes shell 142 disposed around 3D part 112, where shell 142 is a porous structure that desirably encases 3D part 112 and is rigidly tethered to outer frame 116 via extensions 118. In this embodiment, 3D part 112 is desirably not connected to shell 142, allowing a limited range of movement of 3D part 112 within shell 142. However, the gap between 3D part 112 and shell 142 is desirably small enough such that pneumatic accelerations over the gap distance do not generate enough momentum to fracture 3D part 112. This arrangement allows protective structure 114 to protect 3D part 112 in the same manner as discussed above for protective structure 14, while also preventing the surface of 3D part 112 from being marred due to direct connections with extensions 118.

As in the first embodiment, the high shear air flow and the powder materials can flow through shell 142, thereby allowing the unbound powder materials caked to 3D part 112 to be removed. The dimensions of shell 142 may be generated by offsetting the exterior perimeter of 3D part 112 by an offset distance and creating a thin porous structure (e.g., a cage, web, or screen-like structure). Examples of suitable offset distances range from about 0.01 inches to about 0.10 inches. Outer frame 116 may be generated as discussed above, such as by defining a bounding box for 3D part 112. Extensions 118 may then be generated to rigidly tether shell 142 to outer frame 116.

In embodiments in which multiple 3D parts are built within build chamber 120 (e.g., multiple 3D parts 112), each 3D part may be retained within a separate shell (e.g., shell 142) and a single protective structure 114 may envelope all of the 3D parts and shells. This prevents the 3D parts from impact damage against the walls of build chamber 120 (or other de-powdering chamber), and prevent the 3D parts from impact damage against each other.

In alternative embodiments, shell 142 may only encase one or more portions of 3D part 12, thereby exposing the non-encased portions of 3D part 112. For example, in the embodiment shown in FIG. 3, shell 142 may alternatively consist of multiple, porous rings that extend around the fuselage of the aircraft 3D part 112. In this example, extensions 118 are desirably connected to the rings, and the rings desirably allow only a limited range of movement of 3D part 112.

System 10 may build 3D part 112 and protective structure 114 in a layer-by-layer manner by delivering incremental layers of one or more powder materials, as discussed above. Accordingly, 3D part 112 and protective structure 114, including outer frame 116, extensions 118, and shell 142, may be built from the same powder materials, where the unbound powder materials may function as a support structure for supporting overhanging regions of 3D part 112 and protective structure 114. For example, a portion of the unbound powder materials may function as a support structure between the bound materials of 3D part 112 and shell 142, thereby allowing 3D part 112 to remain disconnected from shell 142.

When the build operation is complete in system 110, the unbound powder materials may then be removed from build chamber 120 in an automated manner, as discussed above. Protective structure 114 protects 3D part 112 from damage by externally applied shears, impacts, torques, and general abuse required to de-powder build chamber 120 (or other de-powdering chamber). As discussed above, the limited range of movement between 3D part 112 and shell 142 is desirably small enough such that pneumatic accelerations over the gap distance do not generate enough momentum to fracture 3D part 112.

The high shear air flow used in the de-powdering process is desirably sufficient to remove the unbound powder materials that remain caked to 3D part 112. While being subjected to the high shear air flow, protective structure 114 protects 3D part 112 from damage by tethering and restraining shell 142 relative to outer frame 116 with the use of extensions 118. For example, the high shear air flow may blow 3D model 112 and protective structure 114 around within build chamber 120 (or other de-powdering chamber), such as due to turbulent air flow vortices. This acceleration may cause protective structure 114 to impact various walls of the chamber, thereby causing protective structure 114 to absorb the damage from the impacts. This prevents 3D part 112, particularly any fine features of 3D part 112, from being damaged during the de-powdering process with the high shear air flow.

After the de-powdering process is complete, shell 142 of protective structure 114 may be broken off or otherwise removed from around 3D part 112. Because extension 118 are not directly connected to 3D part 112, the surface of 3D part 112 is not marred from any connection points.

Figure 4:
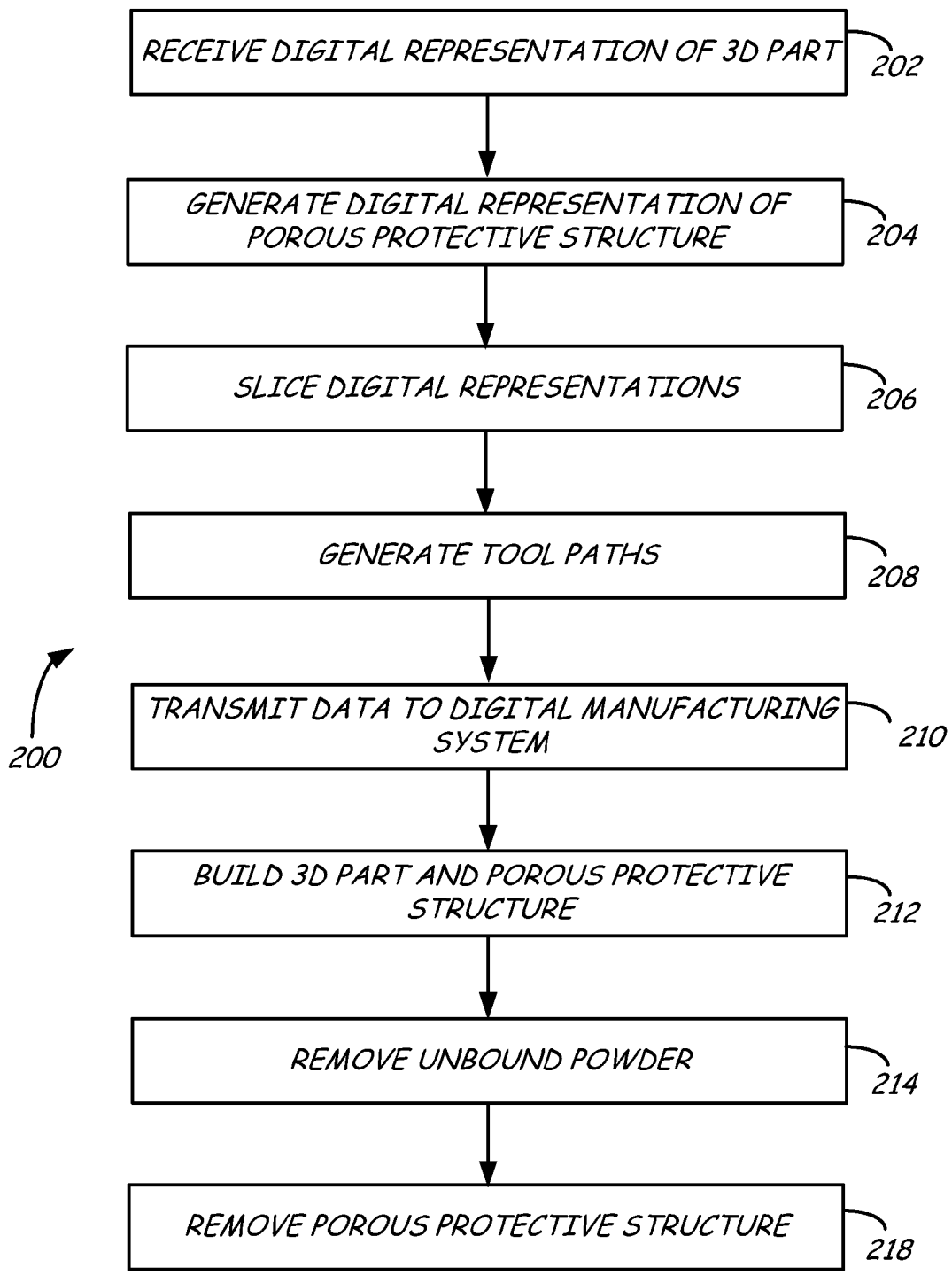
FIG. 4 is a flow diagram of a method for building a 3D part with a porous protective structure.

As shown in FIG. 4, method 200 is an example of a suitable technique for generating porous protective structures (e.g., protective structures 14 and 114), building 3D parts with powder-based systems, and removing the unbound powder materials. The following discussion of method 200 is made with reference to a single 3D part and a single porous protective structure with the understanding that method 200 may also suitable for use with a plurality of 3D parts and a plurality of porous protective structures in the same manner.

Method 200 includes steps 202-218, and initially involves receiving a digital representation of a 3D part (step 202). For example, a customer may submit the digital representation to a manufacturer that operates one or more additive manufacturing systems. The manufacturer may receive the digital representation from a variety of media, such as over an Internet network or on a physical data storage medium. Upon receipt, the digital representation may be stored on one or more non-volatile media, and the computer-based system may initially clean up and reorient the digital representations to desirably optimize one or more build properties.

The computer-based system may then generate a digital representation of the porous protective structure (step 204), where the dimensions of the porous protective structure may vary as discussed above for protective structures 14 and 114. In one embodiment, the computer-based system may generate the outer frame (e.g., outer frames 16 and 116) based on a bounding box for the 3D part. In the embodiment shown in FIG. 3, which includes shell 142, the computer-based system may also generate the offset porous shell to be built around the 3D part. The computer-based system may then generate extensions (e.g., extensions 18 and 118) to interconnect the outer frame with either the 3D part or the offset porous shell.

The digital representation of the 3D part and the porous protective structure may then be sliced into a plurality of layers using a slicing algorithm (step 206). Because the 3D part and the porous protective structure may be fabricated from the same powder materials, the computer-based system may treat the digital representation of the 3D part and the digital representation of the porous protective structure as a single digital representation for slicing. In alternative embodiments, steps 204 and 206 of method 200 may be reversed such that sliced layers of the porous protective structure may be generated after the digital representation of the 3D part is sliced into a plurality of layers.

The computer-based system may then generate tool paths for each sliced layer (step 208). The sliced layers and the generated tool paths may be stored on one or more non-volatile media, and/or temporarily stored on volatile media. The resulting build data may then be transmitted to one or more additive manufacturing systems (e.g., a powder-based digital manufacturing system) (step 210). The additive manufacturing system may then build the 3D part and corresponding porous protective structure using one or more layer-based additive manufacturing techniques, based on the received build data (step 212).

Suitable materials for building the 3D part and porous protective structure may vary depending on the particular additive manufacturing system used. For example, in a powder/binder system, suitable powder materials may include polymeric materials such as polymethyl methacrylate (PMMA), including PMMA powders having an average particle diameters ranging from about 30 micrometers to about 80 micrometers. Examples of suitable binder resins in the powder/binder system include curable materials, such as epoxy-based resins and solutions.

When the build operation is complete, the unbound powder materials may then be removed using high shear air flow (step 214). While being subjected to the high shear air flow, the porous protective structure protects the 3D part from damage by operably tethering and restraining the 3D part within the outer frame of the porous protective structure. For example, as discussed above, the high shear air flow may blow the 3D part and the porous protective structure around within the chamber, such as due to turbulent air flow vortices. This may cause the porous protective structure to impact various walls of the chamber, thereby causing the porous protective structure to absorb the damage from the impacts. This prevents the 3D part, particularly any fine features of the 3D part, from being damaged during the de-powdering process with the high shear air flow. As discussed above, because high shear air flow may be used to remove the unbound powder materials, the de-powder process may be fully automated.

Although the present disclosure has been described with reference to preferred embodiments, workers skilled in the art will recognize that changes may be made in form and detail without departing from the spirit and scope of the disclosure.

The invention claimed is:

1. A method for building a three-dimensional part, the method comprising:
receiving a digital representation of the three-dimensional part;
generating a digital representation of a of a porous structure comprising:
a digital representation of a porous outer frame for the three-dimensional part; and
a digital representation of at least one extension between the porous outer frame and the three-dimensional part, wherein the at least one extension is configured to operably tether the three-dimensional part within the porous outer frame; and
generating layer-based tool paths for building the building the three-dimensional part in a powder-based, additive manufacturing system, the layer-based tool paths being generated based at least in part on the digital representation of the three-dimensional part and the digital representation of the porous structure.

2. The method of claim 1, wherein the digital representation of the at least one extension is configured to rigidly connect the three-dimensional part to the porous outer frame.

3. The method of claim 1, wherein the digital representation of the porous structure further comprises a digital representation of a porous shell that at least partially encases the three-dimensional part, wherein the digital representation of the at least one extension is configured to rigidly connect the porous shell to the porous outer frame.

4. The method of claim 3, wherein generating the digital representation of the porous shell comprises determining at least one offset distance from the three-dimensional part, the at least one offset distance ranging from about 0.01 inches to about 0.10 inches.

5. The method of claim 1, and further comprising:
forming a layer of a powder material in a build chamber of the powder-based additive manufacturing system;
solidifying portions of the powder material based on at least a portion of the generated layer-based tool paths to build the three-dimensional part in a bed of unbound powder material; and
removing at least a portion of the unbound powder material from the three-dimensional part.

6. The method of claim 5, wherein removing the portion of the unbound powder material from the three-dimensional part comprises generating an air flow around the three-dimensional part and the porous structure sufficient to move the porous structure.

7. The method of claim 5, and further comprising removing the porous structure from the three-dimensional object after removing the portion of the unbound powder material from the three-dimensional part.

8. A method for removing unbound powder materials from a three-dimensional part, the method comprising:
providing a chamber containing a three-dimensional part operably tethered to a porous structure, wherein the three-dimensional part and the porous structure are built from a powder-based additive manufacturing system with a powder material; and
generating an air flow around the three-dimensional part and the porous structure that is sufficient to remove substantially all unbound powder materials from the three-dimensional part.

9. The method of claim 8, wherein generating an air flow comprises an action selected from the group consisting of directing compressed air to the three-dimensional part, generating a vacuum, and a combination thereof.

10. The method of claim 8, and further comprising moving the three-dimensional part and the porous structure with the generated air flow at a sufficient velocity to damage at least a portion of the porous structure.

11. The method of claim 8, and further comprising building the three-dimensional and the porous structure in the chamber with the powder-based additive manufacturing system.

12. The method of claim 11, wherein building the three-dimensional and the porous structure comprises:
delivering layer of the powder material to a build chamber of the powder-based additive manufacturing system; and
solidifying portions of the powder material based on layer-based tool paths.

13. The method of claim 8, wherein the porous structure comprises:
a porous outer frame; and
at least one extension connected to the porous outer frame and operably tethering the three-dimensional part within the porous outer frame.

14. A three-dimensional assembly built with a powder-based, digital manufacturing system, the three-dimensional assembly comprising:
a three-dimensional part based at least in part on a digital representation of the three-dimensional part; and
a porous structure configured to protect the three-dimensional part during a de-powdering process, the porous structure comprising:
a porous outer frame; and
at least one extension connected to the porous outer frame and operably tethering the three-dimensional part within the porous outer frame.

15. The three-dimensional assembly of claim 14, wherein the at least one extension is rigidly connected to the three-dimensional part to operably tether the three-dimensional part within the porous outer frame.

16. The method of claim 15, wherein the porous structure further comprises a porous shell that at least partially encases the three-dimensional part, wherein the at least one extension is connected the porous shell to operably tether the three-dimensional part within the porous outer frame.

17. The method of claim 16, wherein the porous shell is offset from the three-dimensional object by an average offset distance ranging from about 0.01 inches to about 0.10 inches.

18. A system for building a three-dimensional part, the system comprising:
a build chamber;
a powder delivery system configured to deliver powder materials to the build chamber;
a tool head configured to solidify portions of the delivered powder materials to form layers of the three-dimensional part and layers of a porous structure; and
an automated powder removal system configured to remove unbound powder materials from the build chamber, wherein the porous structure is configured to protect the three-dimensional part from damage during a de-powdering process.

19. The system of claim 18, wherein the automated powder removal system is configured to generate an air flow around the three-dimensional part and the porous structure that is sufficient to move the three-dimensional part and the porous structure.

20. The system of claim 18, wherein the tool head comprises a jetting head configured to deposit at least one binder material.

\* \* \* \* \*